US012800947B2

(12) United States Patent
Simpson

(10) Patent No.: US 12,800,947 B2
(45) Date of Patent: Nov. 17, 2026

(54) HEADBAND WITH DROP-DOWN SUNGLASSES

(71) Applicant: Sean Simpson, Lexington, KY (US)

(72) Inventor: Sean Simpson, Lexington, KY (US)

( * ) Notice: Subject to any disclaimer, the term of this patent is extended or adjusted under 35 U.S.C. 154(b) by 0 days.

(21) Appl. No.: 19/377,259

(22) Filed: Nov. 3, 2025

(65) Prior Publication Data

US 2026/0118694 A1 Apr. 30, 2026

Related U.S. Application Data

(63) Continuation-in-part of application No. 18/638,288, filed on Apr. 17, 2024, now Pat. No. 12,458,087.

(51) Int. Cl.

| | |
|---|---|
| ***A41D 20/00*** | (2006.01) |
| ***G02C 3/00*** | (2006.01) |
| ***G02C 7/10*** | (2006.01) |
| ***G02C 7/12*** | (2006.01) |

(52) U.S. Cl.

CPC ............. *G02C 3/003* (2013.01); *A41D 20/00* (2013.01); *G02C 7/10* (2013.01); *G02C 7/12* (2013.01)

(58) Field of Classification Search

CPC .................................. A41D 20/00; G02C 3/02

See application file for complete search history.

(56) References Cited

U.S. PATENT DOCUMENTS

| | | | | |
|---|---|---|---|---|
| 2,179,719 A * | 11/1939 | Goskey | A61F 9/045 | 2/10 |
| 4,520,510 A * | 6/1985 | Daigle | G02C 3/003 | 2/454 |
| 4,616,367 A * | 10/1986 | Jean, Jr. | A61F 9/025 | 2/452 |
| 4,712,254 A * | 12/1987 | Daigle | A41D 20/00 | 2/454 |
| 4,811,430 A * | 3/1989 | Janusz | A61F 9/027 | 2/454 |
| 4,885,808 A * | 12/1989 | Carpenter | G02C 3/02 | 351/59 |
| 5,009,496 A * | 4/1991 | Holtan, Jr. | A42B 1/247 | 351/123 |
| 5,105,475 A * | 4/1992 | Lynd | A61F 9/025 | 2/10 |
| 5,920,371 A * | 7/1999 | Chang | G02B 27/0176 | 351/158 |
| 12,458,087 B2 * | 11/2025 | Simpson | G02C 3/006 | |
| 2009/0056000 A1 * | 3/2009 | de Taboada | A42B 1/247 | 2/10 |
| 2015/0335088 A1 * | 11/2015 | Maggio | G02C 3/02 | 2/209.13 |

* cited by examiner

*Primary Examiner* — Tajash D Patel

(74) *Attorney, Agent, or Firm* — Stockwell & Smedley, PSC

(57) ABSTRACT

An eyeglasses and headband combination apparatus including a headband having a pocket defined therein, and eyeglass lenses inserted into the headband and retained by a non-permanent engagement that enables the eyeglasses to be alternately movable from being stored in the pocket to being extended from the pocket for convenient use, wherein the non-permanent engagement also allows for quick removal and replacement of the lens.

18 Claims, 7 Drawing Sheets

HEADBAND WITH DROP-DOWN SUNGLASSES

FIELD OF THE INVENTION

The invention relates to headgear which can be used in combination with eyeglasses to form an eyeglasses and headgear combination apparatus, and more particularly, to an eyeglasses and headband combination apparatus, and even more particularly to a headband with drop-down sunglasses.

BACKGROUND OF THE INVENTION

People engage in a wide variety of physical activities while wearing eyeglasses, either sunglasses or prescription lenses. Headgear, including headbands, caps, sweatbands or the like, are often worn during the such physical activity for the comfort of the user. People often desire or need to wear eyeglasses at the same time they are wearing the headgear. The eyeglasses may be sunglasses, prescription eyeglasses or protective eyewear.

On the recreational side, people often use sweatbands and sunglasses in sports activities involving perspiration and conducted outdoors, such as jogging, biking, rowing, tennis and the like. Similarly, mountain climbing, horseback riding, canoeing, kayaking, and other activities involve exertion and require that eyeglasses be held stable during the activity.

On the vocational side, people could often use an accessory that provides stability of the eyeglasses and, at the same time, protection from perspiration interfering with the vision. For example, professionals as disparate as surgeons and iron workers have a need to be assured that their eyeglasses remain in the proper position while they work.

Present eyeglasses and headgear typically function only independent of each other. The eyeglasses are purchased at specialty shops and selected according to the taste and preferences of the user. Headbands, ear warmers, sweatbands, goggles and other headgear are purchased separately from eyeglasses according to the needs, tastes, and desires of the user. When used simultaneously, the user would usually put on the eyeglasses first and then place the headgear over the eyeglasses. Should the person need to remove the eyeglasses, such as for cleaning, adjusting or walking from the outside sunshine into the inside, it is often necessary first to remove the headgear, or store the glasses someplace, which invariably increases the possibility that the glasses are damaged, forgotten or stolen. The headgear may also interfere with the user putting the eyeglasses back on. The option of using ‘flip-ups’ sunglasses traditionally used by baseball players is not attractive to users who do not want the bulky sunglass lens pointing out perpendicular to their forehead when in the ‘up’ position. Whereas ‘flip-ups’ are handy for baseball players who need to make immediate changes from the up position to the down position, flip-ups are prone to breakage and making the user look awkward and/or funny. Further, flip-ups are prone to breakage and therefore not desirable to users who frequent the outdoors and want a reliable retractable sunglass apparatus that is fashionable, comfortable and convenient to use.

A further disadvantage is that the headgear may contact the eyeglasses, creating discomfort on the part of the user which is not present when the headgear is not in use. Conversely, the eyeglasses may interfere with the function and use of the headgear. Also, traditional eyeglasses may irritate the backs of the ears and, in an active sports setting, may not remain securely in place, often sliding down the nose or even falling off.

Thus, in view of the above, there is a long-felt need to address the aforementioned inefficiencies and inadequacies. Further limitations and disadvantages of conventional and traditional approaches will become apparent to one of skill in the art through comparison of described methods and systems disclosed herein.

SUMMARY OF THE INVENTION

The invention has many important advantages overcoming the deficiencies cited above, among other things. Some embodiments of the invention are directed to a combination headgear and eyeglasses which enables the eyeglasses to be stored within the headgear in a configuration that makes the eyeglasses easily accessible from storage to be specifically positioned with respect to the eyes and nose to be comfortable for the user.

Some embodiments of the invention are directed to an eyeglasses and headband combination apparatus comprising: a headband having an annular shape and being configured and dimensioned to be worn on the head of a user, wherein the headband includes a circumferential pocket spanning the forehead area, the pocket being defined between a first wall and a second wall, the pocket having a circumferential opening defined between a first wall edge and a second wall edge, wherein the second wall edge further includes a first engagement member, the first engagement member protruding radially inward over a portion of the circumferential opening; eyeglasses within the circumferential pocket and engageable with the headband, the eyeglasses including an upper peripheral edge, the upper peripheral edge including a second engagement member, the second engagement member protruding radially outward; and wherein the first engagement member and the second engagement member are positioned and dimensioned to cooperate with one another, whereby axial movement of the eyeglasses from the circumferential pocket in a first direction forms a non-permanent engagement of the first engagement member and the second engagement member to restrict further axial movement of the eyeglasses in the first direction, and axial movement of the eyeglasses in a second direction disengages the non-permanent engagement of the first engagement member and the second engagement member.

In some embodiments, the first engagement member comprises a gutter having a radially inward wall and an axial wall. In some embodiments, the second engagement member comprises a lip having a radially outward wall and an axial wall.

The headband may have a second pocket or a first width and a second width, the first width being in a portion of the headband with the pocket, wherein the first width is greater than the second width.

Some embodiments of the invention are directed to an eyeglasses and headgear combination apparatus comprising: a headgear an annular shape and being configured and dimensioned to be worn on the head of a user, wherein the headgear includes a circumferential pocket spanning the forehead area, the pocket being defined between a first wall and a second wall, the pocket having a circumferential opening defined between a first wall edge and a second wall edge, wherein the second wall edge further includes a first engagement member, the first engagement member comprising a first gutter wall protruding radially inward over a portion of the circumferential opening and a second gutter wall protruding axially in the direction of the pocket; eyeglasses within the circumferential pocket and engageable with the headband, the eyeglasses including an upper peripheral edge, the upper peripheral edge including a second engagement member, the second engagement member including a first lip wall protruding radially outward and a second lip wall protruding axial in the direction of the circumferential opening; and wherein the first engagement member and the second engagement member are positioned and dimensioned to cooperate with one another, whereby axial movement of the eyeglasses from the circumferential pocket in a first direction forms a non-permanent engagement of the first engagement member and the second engagement member to restrict further axial movement of the eyeglasses in the first direction, and axial movement of the eyeglasses in a second direction disengages the non-permanent engagement of the first engagement member and the second engagement member.

In some embodiments, the first direction and the second direction are opposite one another.

In some embodiments, a distal edge of second lip wall contacts the first gutter wall responsive to the non-permanent engagement of the first engagement member and the second engagement member.

In some embodiments, a distal edge of second gutter wall contacts the first lip wall responsive to the non-permanent engagement of the first engagement member and the second engagement member.

In some embodiments, a the second gutter wall contacts the second lip wall responsive to the non-permanent engagement of the first engagement member and the second engagement member.

Some embodiments of the invention are directed to an eyeglasses and headband combination apparatus comprising: a headband having a body with an annular shape which is configured and dimensioned to be worn on the head of a user, wherein the headband includes a circumferential pocket formed by an opening in the body, the pocket having an interior pocket wall and cavity, the interior pocket wall having one or more grommets therein; an eyeglasses attachable to the headband by one or more connectors, each of the one or more connectors having an elongated body defining a first end and a second end, the first end opposing the second end, the first end of each of the one or more connectors being attached to at least one of a bridge position defined on the eyeglasses, a first lens position defined on the eyeglasses and a second lens position defined on the eyeglasses, the elongated body of each of the one or more connectors extending through the grommet, wherein the one or more connectors are alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headband.

In some embodiments, the eyeglasses are movable along the elongated body of the one or more connectors.

In some embodiments of the eyeglasses and headband combination apparatus, the second end is of a greater diameter than the grommet and the elongated body.

In some embodiments of the eyeglasses and headband combination apparatus, the first end of the one or more connectors is non-permanently attached with the at least one of a bridge position defined on the eyeglasses, a first lens position defined on the eyeglasses and a second lens position defined on the eyeglasses.

In some embodiments of the eyeglasses and headband combination apparatus, the first end of the one or more connectors is permanently attached with the at least one of a bridge position defined on the eyeglasses, a first lens position defined on the eyeglasses and a second lens position defined on the eyeglasses.

In some embodiments of the eyeglasses and headband combination apparatus, the body of the headband has a first axial width and a second axial width, the first axial width being in a portion of the body with the pocket, the second axial width being in a remaining portion of the body, wherein the first axial width is greater than the second axial width.

In some embodiments, the eyeglasses and headband combination apparatus further includes a second pocket. The second pocket may be a storage pocket accessible on a surface of the headband.

In some embodiments, the eyeglasses and headband combination apparatus further includes an area defined on a surface of the headband for indicia to be disposed thereon. The indicia may include text or graphics, such as for promotional or marketing purposes.

Some other embodiments of the invention are directed to an eyeglasses and headgear combination apparatus comprising: a headgear having a body configured and dimensioned to be worn by a user, wherein the headgear includes a pocket formed in the body defining a first wall and a second wall, the second wall having one or more grommets therein; eyeglasses attachable to the headgear, the eyeglasses including a bridge position defined on the eyeglasses, a first lens position defined on the eyeglasses and a second lens position defined on the eyeglasses; and one or more connectors, each of the one or more connectors having an elongated body defining a first end and a second end, the first end opposing the second end, the first end of each of the one or more connectors being attached to at least one of the bridge position, the first lens position and the second lens position, the elongated body of each of the one or more connectors extending through the grommet, the second end being of a greater diameter than the grommet and the elongated body, wherein the elongated body is alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headgear.

In some embodiments, the first end of the one or more connectors is non-permanently attached with the at least one of a bridge position defined on the eyeglasses, a first lens position defined on the eyeglasses and a second lens position defined on the eyeglasses.

In some embodiments, the first end of the one or more connectors is permanently attached with the at least one of a bridge position defined on the eyeglasses, a first lens position defined on the eyeglasses and a second lens position defined on the eyeglasses.

In some embodiments, the headgear comprises a headband. The headband body may be annular. The headband body may have a first axial width and a second axial width, the first axial width being in a portion of the body with the pocket, wherein the first axial width is greater than the second axial width.

Some embodiments of the invention eyeglasses and headband combination apparatus comprising: a headband having a body with an annular shape being configured and dimensioned to be worn on the head of a user, the annular shape defining an upper rim and a lower rim, wherein the body includes a pocket with a circumferential opening thereto in the lower rim, the pocket having an interior wall defining a cavity therein, the interior wall having a liner with one or more grommets; eyeglasses attachable to the headband, the eyeglasses including a bridge position defined on the eyeglasses, a first lens position defined on the eyeglasses and a second lens position defined on the eyeglasses; and one or more connectors, each of the one or more connectors having an elongated body defining a first end and a second end, the first end opposing the second end, the first end of each of the one or more connectors being permanently attached to at least one of a bridge position defined on the eyeglasses, a first lens position defined on the eyeglasses and a second lens position defined on the eyeglasses, the elongated body of each of the one or more connectors extending through the grommets, the second end being of a greater diameter than the grommet and the elongated body, wherein the elongated body is alternately movable through the grommet to a first condition whereby the eyeglasses are stored in the pocket, and to a second condition whereby the eyeglasses are extended from the pocket, wherein the second end of each of the one or more connectors is secured to the grommet whereby each of the one or more connectors is non-removable from headband, and wherein the headband has a first width and a second width, the first width being in a portion of the body with the pocket, wherein the first width is greater than the second width.

In some embodiments the headband is constructed of a material having a property of being water absorbent.

In some embodiments, the headband is constructed of a material having a property of being elastic.

In some embodiments, the eyeglasses are polarized.

In some embodiments, the combination includes an area defined on an outer surface of the portion of the headband with the pocket for indicia to be disposed thereon.

Yet other objects and advantages of the invention will become readily apparent to those skilled in the art, following the detailed description, wherein various presently preferred and exemplary embodiments of the invention are shown and described. As discussed herein, the invention is capable of other and different embodiments, and its several details are capable of modifications in various obvious respects, all without departing from the scope of the invention. Accordingly, the drawings and description thereof are to be regarded as illustrative in nature, and not as restrictive.

BRIEF DESCRIPTION OF THE DRAWINGS

These and other aspects of the systems and methods of the invention will become more readily apparent to those having ordinary skill in the art from the following description of an exemplary embodiment of the invention taken in conjunction with the accompanying drawings, wherein various elements are not to scale so as to show like reference numerals may refer to like parts.

DETAILED DESCRIPTION OF SOME EMBODIMENTS OF THE INVENTION

Figure 1:
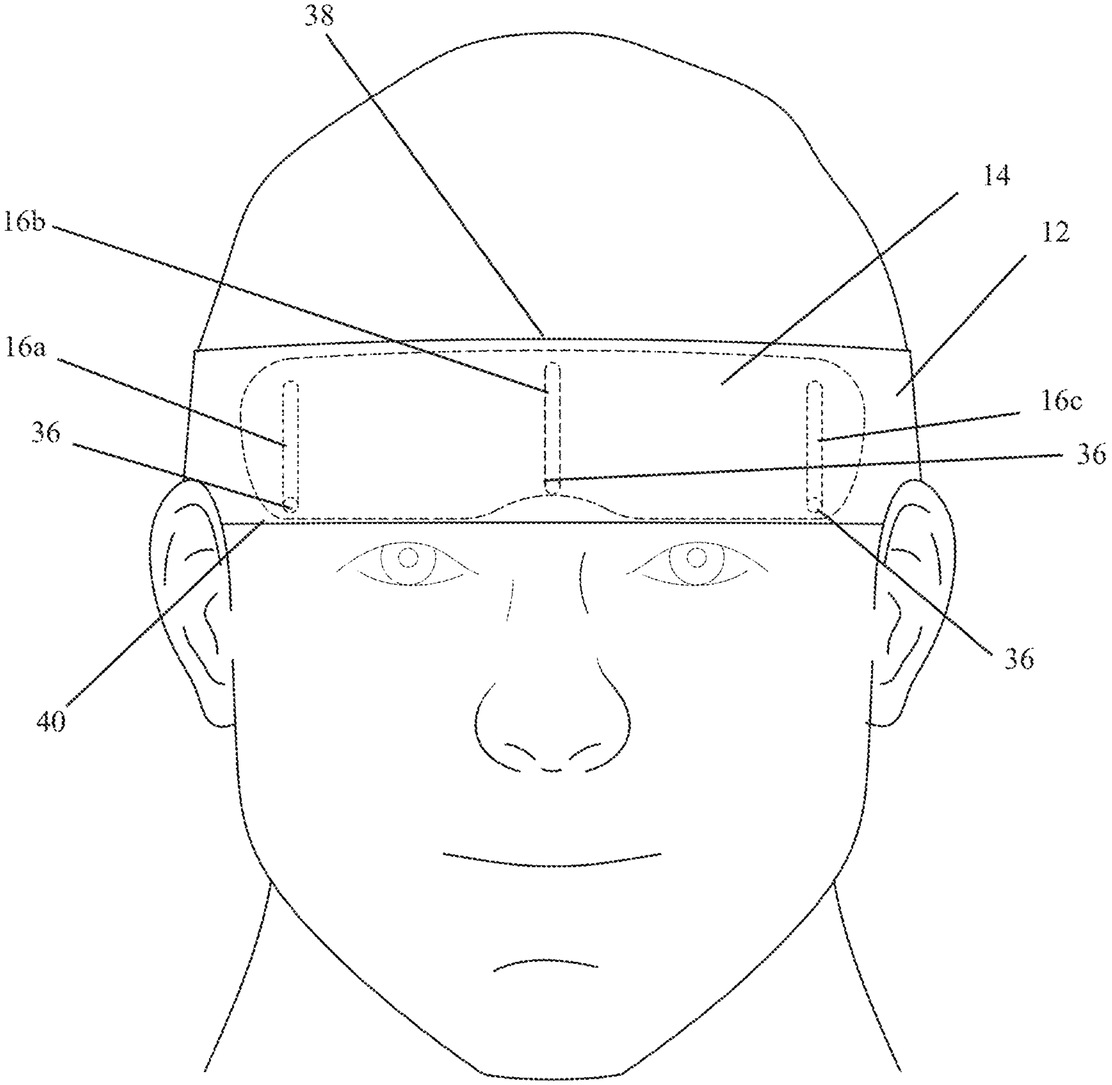
FIG. 1 is a front view of a headband and eyeglasses combination apparatus constructed in accordance with some exemplary embodiments of the invention, illustrating the eyeglasses being stored in the pocket of the headband while the apparatus is worn by a user.
Figure 2:
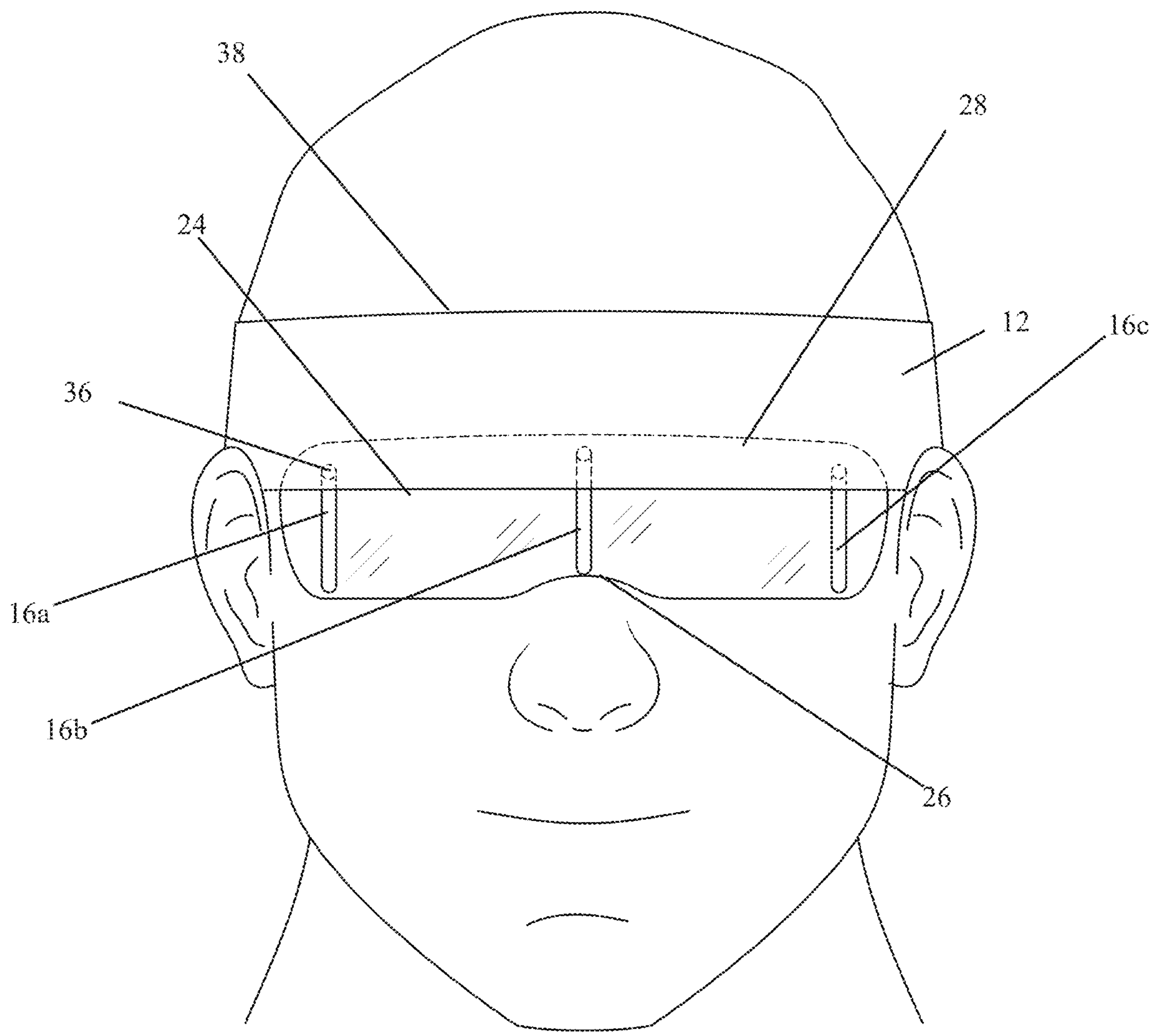
FIG. 2 is another front view of the apparatus of FIG. 1, illustrating the eyeglasses being partially extended from the pocket while the apparatus is worn by a user.
Figure 3:
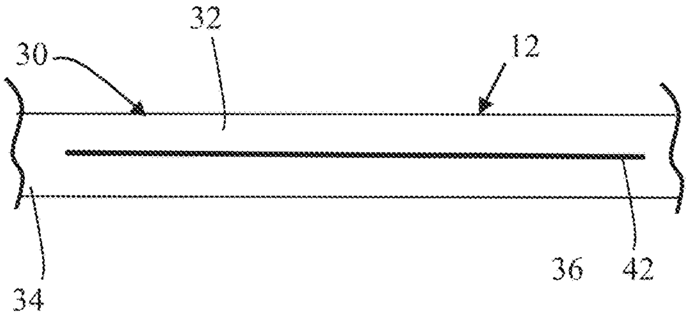
FIG. 3 illustrates a partial cross-sectional view of the headband of FIG. 1 without eyeglasses being connected thereto.
Figure 4:
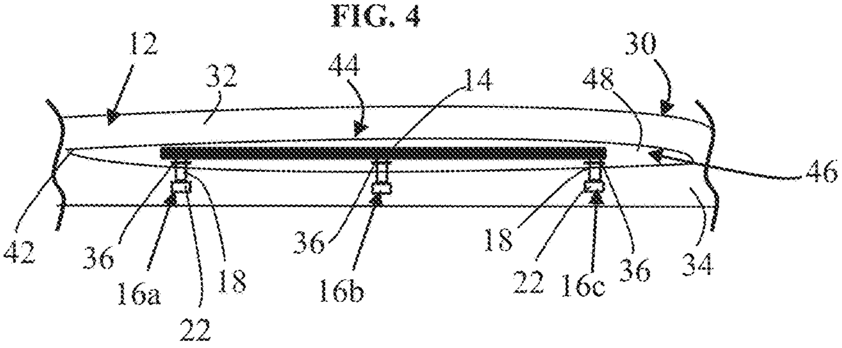
FIG. 4 illustrates a partial cross-sectional view of the headband of FIG. 1, depicting the pocket being opened and eyeglasses being stored in the pocket.
Figure 5:
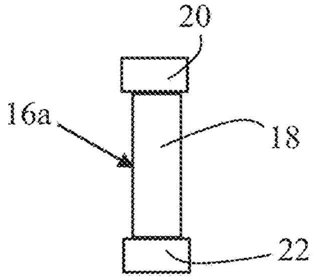
FIG. 5 illustrates a connector used to attach eyeglasses to the headband of FIG. 1.

The invention may be best understood with reference to the detailed figures and description set forth herein. In this description, various aspects of selected embodiments are described. However, it will be apparent to those of ordinary skill in the art and others that alternate embodiments may be practiced with only some or all of the aspects. In some instances, well-known features are omitted or simplified in order not to obscure the illustrated embodiments. Thus, those skilled in the art will readily appreciate that the detailed descriptions provided herein with respect to the figures are merely for explanatory purposes, as the methods and systems may extend beyond the described embodiments. For instance, the teachings presented, and the needs of a particular application, may yield multiple alternative and suitable approaches to implement the functionality of any detail described herein. Therefore, any approach may extend beyond certain implementation choices in the disclosed embodiments.

FIGS. 1-5 illustrate a combined headband and eyeglasses apparatus generally referred to by the numeral 10. Apparatus 10 includes a headband 12 and an eyeglasses 14. Eyeglasses 14 is connected with headband 12 by sliding connectors 16*a*, 16*b* and 16*c*, though other connection methods may be employed within the spirit and scope of the invention.

It should be readily apparent that more or less than three sliding connectors 16*a*, 16*b* and 16*c* may be used. In this embodiment, each of the sliding connectors 16*a*, 16*b* and 16*c* is an elongated strip of rigid but deformable material connected with headband 12 and eyeglasses 14. Sliding connectors 16*a*, 16*b* and 16*c* are generally spaced apart at equidistant positions relative to one another.

Each connector 16*a*, 16*b* and 16*c* consists of an elongated body 18 having a first end 20 and opposing second end 22.

The first end 20 of connector 16*a* is secured to eyeglasses 14 at a position in the lens referred to herein as a first lens position 24 of eyeglasses 14. For example, first lens position 24 may be located at the portion of the lens near the right or left eye. The first end 20 of connector 16*b* is secured to eyeglasses 14 at a bridge position 26 of eyeglasses 14. The first end 20 of connector 16*c* is secured to eyeglasses 14 at a second lens position 28. For example, second lens position 28 may be located at the portion of the lens near the right or left eye opposing first lens position 24. Bridge portion 26 is positioned between the opposing first lens 24 and second lens 28. For example, bridge position 26 may be located at the bridge of eyeglasses 14.

In this embodiment, each first end 20 is secured at a generally lower portion of eyeglasses 14 relative to headband 12, such as at a position adjacent to the bottom half of eyeglasses or adjacent to the bottom peripheral edge of first lens 24, bridge portion 26 and second lens 28, respectively.

Headband 12 includes a body 30 having a pocket 44 defined therein. Pocket 44 is formed by an opening 42 which extends into body 30 to form first pocket wall 32 and a second pocket wall 34. First pocket wall 32 and second pocket wall 34 oppose one another and define a cavity or space 46 therebetween. Each second end 22 of connectors 16*a*, 16*b* and 16*c* extends through a grommet 36 defined in pocket 44, such as in the second pocket wall 34 of body 30. Grommets 36 are positioned in body 30 to correspond with the locations of first end 20 such that connector body 18 extends generally axially through opening 42 between headband 12 and eyeglasses 14.

Each connector 16*a*, 16*b* and 16*c* may be secured at second end 22 by having an end portion that is of a larger size, such as a larger diameter, than the size (or diameter) of the opening formed by grommet 36 and the size or diameter of body 18. This allows body 18 to slide through grommet 36 while preventing each connector from detaching by second end 22 limiting movement from the engagement with grommet 36. It should be understood that first end 20 may include a variety of fastening mechanisms for forming a permanent or non-permanent engagement. For example, in some embodiments eyeglasses 14 include grommets (not shown) and first end 20 may be of a larger diameter or size than the grommet. In other embodiments, first end 20 includes a hook, hoop or loop than can be tightened on eyeglasses 14 to secure eyeglasses 14.

In this embodiment, headband 12 has a generally annular body 30 which defines opposing rims at a first edge 38 and a second edge 40. Second edge 40 includes an opening 42 to the pocket 44 formed in body 30. Space 46 which is configured and adapted to accommodate eyeglasses 14 therein.

Eyeglasses 14 may be physically moved from storage in space 46 of pocket 44 by moving eyeglasses 14 through opening 42 with connectors 16*a*, 16*b* and 16*c* also moving or sliding through grommets 36. To return eyeglasses 14 to space 46 in pocket 44, eyeglasses 14 may be physically moved from outside of pocket 44, such as in position on a user's face, through opening 42 in second edge 40 and into space 46, with connectors 16*a*, 16*b* and 16*c* moving or sliding through grommets 36 and into the space 46 defined by pocket 44. In some embodiments, some or all of the interior surface 48 of first wall 32 and second wall 34 defining space 46 of pocket 44 includes a liner or layer of material disposed thereon, which may comprise a plastic or nylon insert secured or engaged within pocket 44 further defining the space 46. Grommets 36 may be formed in the liner or layer of material disposed on surface 48.

Figure 6:
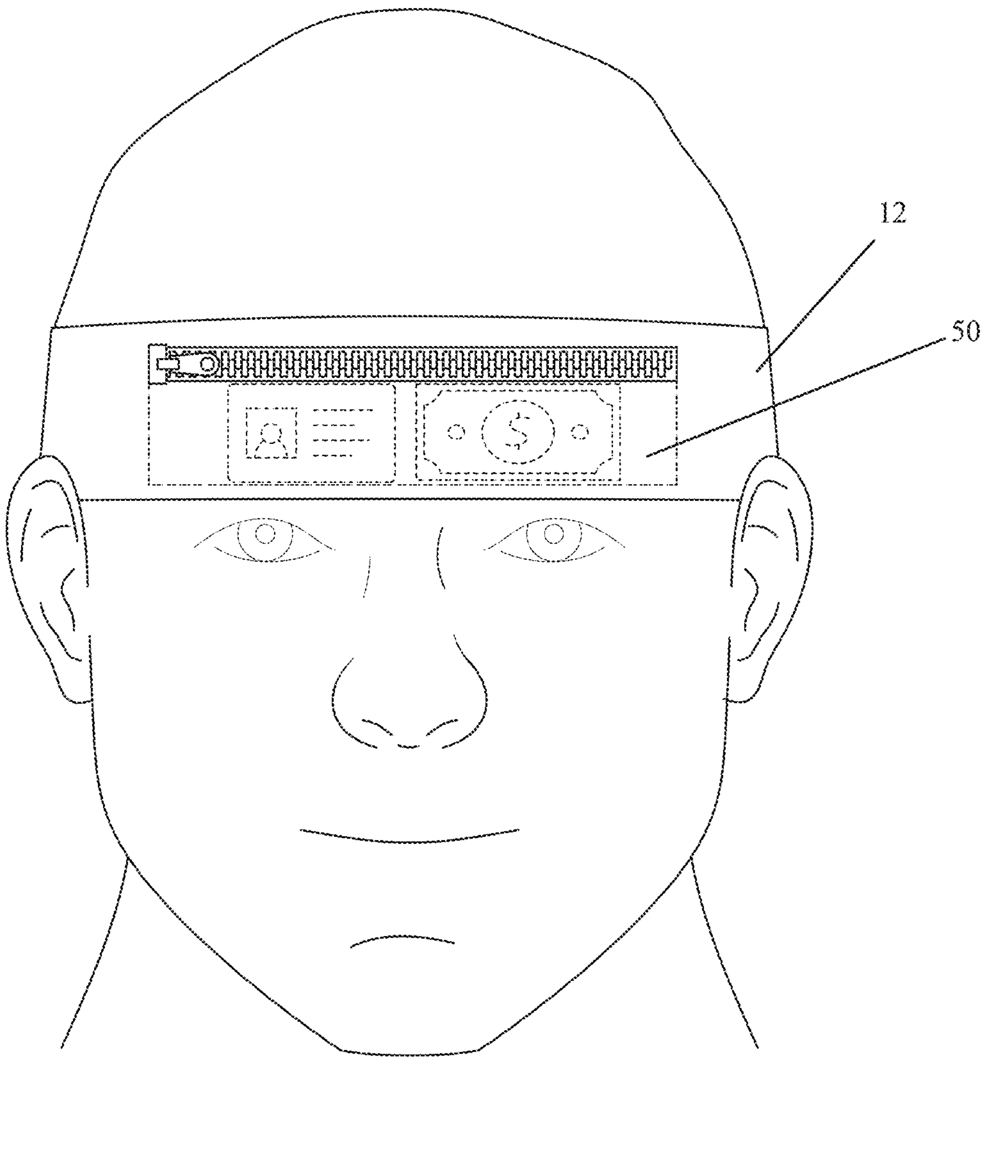
FIG. 6 illustrates a front view of the apparatus of FIG. 1, illustrating a second pocket included in the headband.

As shown in FIG. 6, in some embodiments headband 12 further includes a sealable pocket 50 for storing items such as identification cards and money. Sealable pocket 50 is formed in body 30, or disposed over body 30, such as over pocket 44. Sealable pocket 50 may be sealed in any conventional manner such as by a zipper as shown.

It should be understood that headband 12, including body 30, may be constructed of any suitable material, such as a water absorbent, stretchable material, made of elastic, standard cloth or a stretchable cloth material, or a hybrid or combination like a cotton and synthetic fiber mix. For example, body 30 may be formed of a sponge or spongelike material and/or entirely rubber-coated or rubber-coated in parts, such as in the area of pocket 44. In some embodiments, some or all of apparatus 10, which may include headband 12, body 30 and/or eyeglasses 14, are constructed of neoprene. Materials such as neoprene can impart advantageous features to an apparatus constructed in accordance with the teachings of the invention, such as apparatus 10, including providing for flotation, strength of fabric, increased longevity of use, as well as correspondence with modern fashion trends favoring neoprene or similar products such as purses and backpacks.

Headband 12 may be configured to partially or fully extend about a human head when worn by a user.

Figure 7:
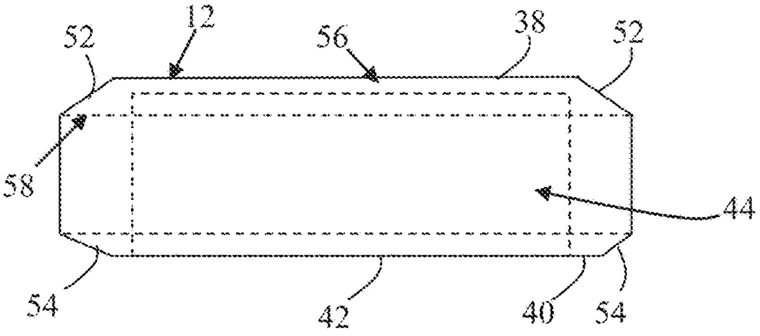
FIG. 7 illustrates a front view of the apparatus of FIG. 1, illustrating the width in the area of the pocket section being greater than the width of the headband in a non-pocket section.

As shown in FIG. 7, in some embodiments, the portion of headband 12 having pocket 44 therein has a greater axial width (between first edge 38 and second edge 40) as compared with the remaining portion of headband 12, which may enable pocket 44 to accommodate various types of eyeglasses 14, among other things. Headband 12 may include upper tapered portions 52 and/or lower tapered portions 54 of headband 12 adjacent to opposing circumferential sides of pocket 44 which facilitate the transition from the wider pocket area 56 of headband 12 to the less wide section 58 of headband 12. In addition, the radial width of body 30 in the area of pocket 44 may be thicker than the remaining radial width of body 30.

Eyeglasses 14 may be any eyeglasses, including sunglasses such as polarized sunglasses. The eyeglasses may also be configured as protective glasses, such as work glasses, goggles or sport glasses, which are designed for user safety or to protect the user from injury, such as injury caused by impact. The eyeglasses may be constructed of a lightweight material, such as polycarbonate. In some embodiments, the eyeglasses are configured to have interchangeable lens. In some embodiments, the eyeglasses are rounded along the bottom edge to avoid potential contact of a sharp edge with a user's face.

Connectors 16*a*, 16*b*, and 16*c*, may be any suitable material, such as an elastic, resilient material or rigid plastic member. In some embodiments, connectors 16*a*, 16*b* and 16*c* may be configured with engagement members at first ends 20 to enable forming an engagement with any eyeglasses.

In some embodiments, an area is defined on body 30, such as in the area of pocket 44, for indicia to be disposed thereon, such as text or graphics, which may be used for promotional or marketing purposes. The indicia may be disposed on the headband by any conventional method, such as direct-to-garment spraying, printing (such as screen printing or transfer printing) or the indicia may be disposed on the headband by first being on a patch or substrate of material which is then adhered sewn onto the headband, for example.

In some embodiments, the eyeglasses is configured to exchange lenses, such as by using a "T" formation at top of lens, to enable the exchange of lenses for different colors and/or to replace scratched lenses.

Figure 8:
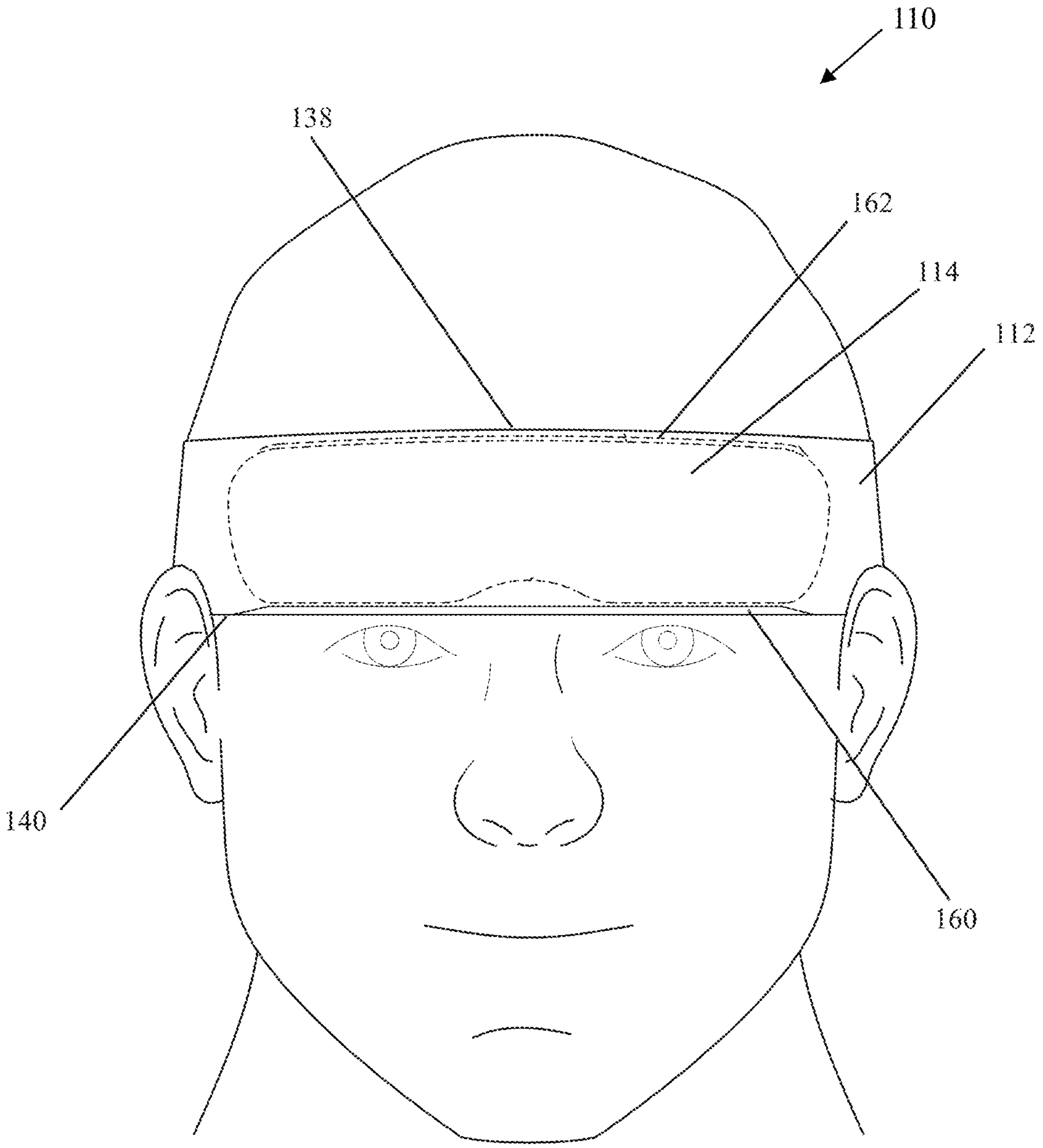
FIG. 8 a headband and eyeglasses combination apparatus constructed in accordance with another exemplary embodiment of the invention, illustrating the eyeglasses being stored in the pocket of the headband while the apparatus is worn by a user.
Figure 9:
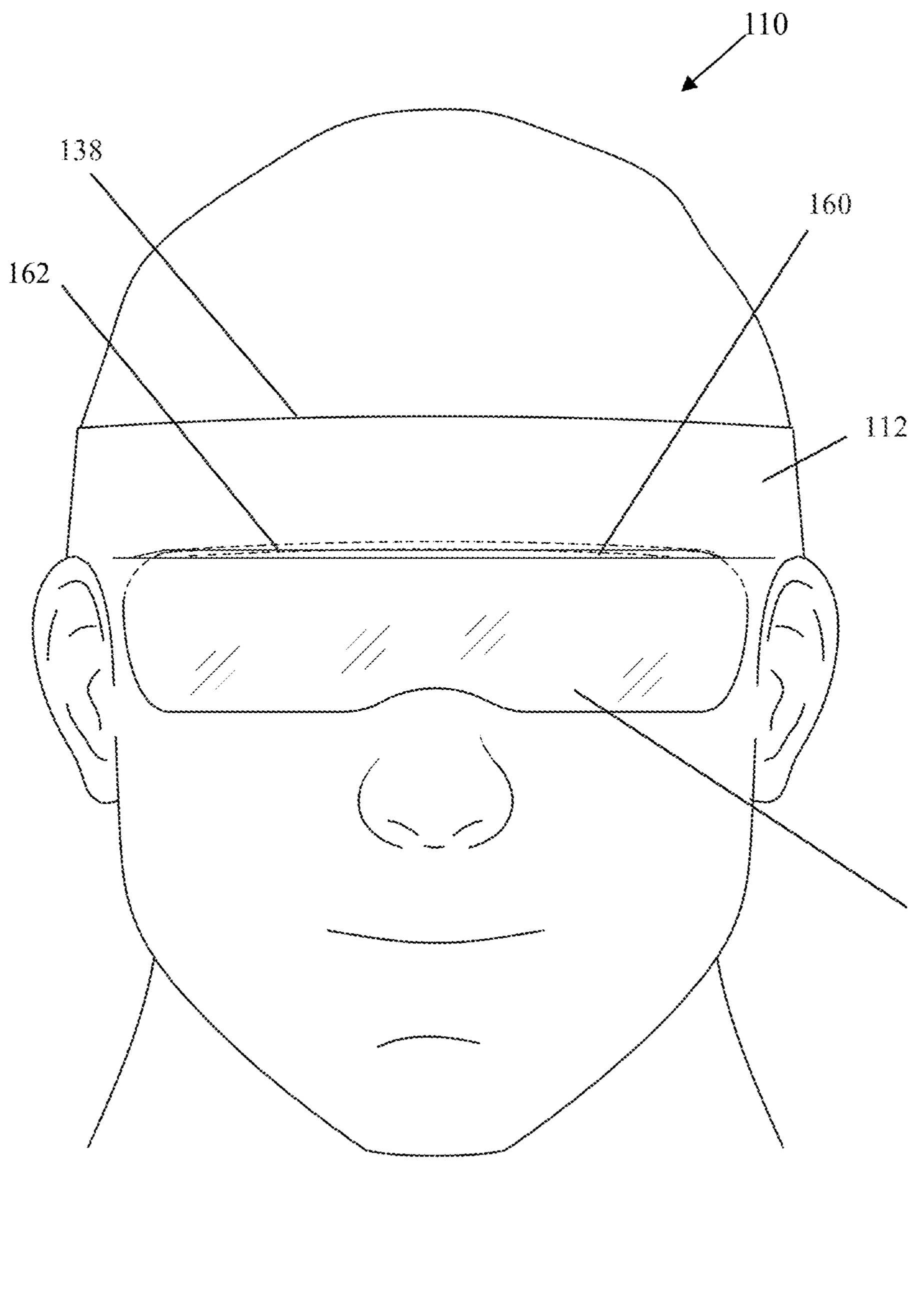
FIG. 9 is another front view of the apparatus of FIG. 8, illustrating the eyeglasses being partially extended from the pocket while the apparatus is worn by a user.
Figure 10:
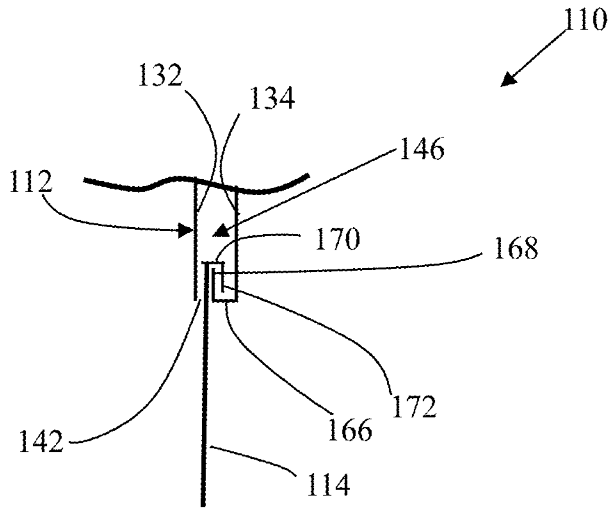
FIG. 10 is a closeup schematic side cross-sectional view of the apparatus of FIG. 8, illustrating the configuration of the first and second engagement members of the headband and eyeglasses described in the embodiments of the invention disclosed herein.

In some embodiments, the headband and eyeglasses of the invention and may include cooperating non-permanent engagement members enabling the eyeglasses to be moved from the pocket in the headband and placed over the eyes of the user, whereby the cooperating members form an engagement that can be disengaged by moving the eyeglasses into the pocket of the headband, The cooperating non-permanent engagement members discussed herein also advantageously enable the eyeglasses or lens therefor to be fully removed from the pocket and replaced within the headband pocket when needed by manipulating the eyeglasses to overcome the engagement member and then reinserting the eyeglasses in position within the pocket, For example, FIGS. 8-10 illustrate apparatus 110 which represents another embodiment of the invention in which headband 112 includes a rim or gutter 160 adjacent to the bottom edge 140 and between first and second side walls 132 and 134, respectively. Eyeglasses 114 include a lip 162 adjacent to the upper peripheral edge 164 of eyeglasses 114 and corresponding with gutter 160.

Gutter 160 includes a first gutter bottom wall 166 protruding radially inward or inwardly from second side wall 134 over opening 142 and in the direction of the first side wall 132. In this embodiment, gutter 160 further includes a second gutter wall 168 protruding axially upward from a distal position of first gutter bottom wall 166 in the direction of cavity 146 and first edge 138.

In this embodiment, protruding lip 162 includes a first lip wall 170 protruding from upper peripheral edge 164 of eyeglasses 114 radially outward or outwardly in the direction of second side wall 134, and incudes a second lip wall 172 protruding axially downward from a distal position of first lip wall 170 in the direction of opening 142 and second edge 140.

In operation, when eyeglasses 114 are drawn from cavity 146, lip 162 engaged with gutter 160 to prevent eyeglasses 114 from being fully removed from cavity 146 and not detached from headband 112 while maintaining in position over the face of a user. In some embodiments, lip 162 and gutter 160 include cooperating elements whereby first lip wall 170 contacts the distal end of second gutter wall 168 and second lip wall 172 contacts first gutter wall 166. In addition, second lip wall 172 may also come into contact with second gutter wall 168.

In some embodiments, gutter 160 and/or lip 162 extend longitudinally along the opening 142 and/or the upper peripheral edge 164 of eyeglasses 114. In other embodiments, gutter 160 and/or lip 162 include a plurality of like-elements intermittently extending longitudinally along the opening 142 and/or the upper peripheral edge 164 of eyeglasses 114 with spaces therebetween.

It should be understood that lip 162 and gutter 160 may be in different shapes, forms and dimensions, and other cooperating members may be used, such as hook-shaped members and receiving slots or loops. The configuration discussed herein advantageously enables eyeglasses 114 to be fully removed from cavity 146, if needed, by moving lip 162 radially away from and over the gutter 160, typically while the headband is removed from the head of a user, thus allowing for the rapid lens replacement, among other things, such as for users seeking to replace scratched lenses, change from sunglasses to regular eyeglasses, or change the color of the lens. Eyeglasses 114 can be replaced in position within cavity 146 in the same manner as it was removed but in the opposite direction.

For example, eyeglasses such as those constructed herein, like eyeglasses 14 and 114, may be easily inserted into the neoprene body 130 by simply opening the ‘clam like’ space 146, such as while the headband is not around anyone’s head and free of that tension. In some embodiments, once the eyeglasses 114 is inserted, it can be pushed fully in so it is in the retracted position, or simply have the top of lens where the molded lip or a “T” shape is placed over a ridge or gutter as shown herein that is toward the bottom of the nylon (slippery) sheath inside the clam opening, which will have the lens fully extended and in use. The upper end of the clam opening is the closed end, which naturally limits the retraction space and stops the lens once fully inserted into the clam space. Eyeglasses of the invention may either come in multiple colors or be configured whereby the lens are removable and easily interchangeable, such as to accommodate sun conditions, or to further the user’s fashion expressions. For example, lens options for eyeglasses may include clear, amber, mirrored and smoke.

It should be further understood that in some embodiments, an apparatus of the invention, such as the headbands and/or eyeglasses shown herein, may further house electronic components, such as a microprocessor, camera, a data communication device, and an audio playing/receiving, among other things.

It should be understood that no limitation of the scope of the invention is intended by the examples provided. It should also be understood that the aforementioned embodiments of the invention may be of any size or shape. Any alterations and further modifications of any inventive feature illustrated herein, and any additional applications of the principles of the invention as illustrated herein which would normally occur to one skilled in the relevant art and having possession of this disclosure are to be considered within the scope of the invention.

This written description uses examples to disclose the invention and also to enable any person skilled in the art to practice the invention, including making and using any devices or systems and performing any incorporated methods. The patentable scope of the invention is defined by the claims, and include other examples that occur to those skilled in the art. Other aspects and features of the invention can be obtained from a study of the drawings, the disclosure, and the appended claims. The invention may be practiced otherwise than as specifically described herein and within the scope of the appended claims. It should also be noted, that the steps and/or functions listed herein and within the appended claims, notwithstanding the order of which steps and/or functions are listed therein, are not limited to any specific order of operation.

While exemplary apparatus, systems and methods of the invention have been described herein and in the accompanying documents, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, by the claims and any equivalents thereto.

The invention claimed is:

1. An eyeglasses and headband combination apparatus comprising:

a headband having an annular shape and being configured and dimensioned to be worn on the head of a user, wherein the headband includes a circumferential pocket spanning the forehead area, the pocket being defined between a first wall and a second wall, the pocket having a circumferential opening defined between a first wall edge and a second wall edge, wherein the second wall edge further includes a first engagement member, the first engagement member protruding radially inward over a portion of the circumferential opening;

eyeglasses within the circumferential pocket and engageable with the headband, the eyeglasses including an upper peripheral edge, the upper peripheral edge including a second engagement member, the second engagement member protruding radially outward, wherein the second engagement member comprises a lip having a radially outward wall and an axial wall; and wherein the first engagement member and the second engagement member are positioned and dimensioned to cooperate with one another, whereby axial movement of the eyeglasses from the circumferential pocket in a first direction forms a non-permanent engagement of the first engagement member and the second engagement member to restrict further axial movement of the eyeglasses in the first direction, and axial movement of the eyeglasses in a second direction disengages the non-permanent engagement of the first engagement member and the second engagement member.

2. The eyeglasses and headband combination apparatus of claim 1, wherein the first engagement member comprises a gutter having a radially inward wall and an axial wall.

3. The eyeglasses and headband combination apparatus of claim 1, wherein the headband has a first width and a second width, the first width being in a portion of the headband with the pocket, wherein the first width is greater than the second width.

4. The eyeglasses and headband combination apparatus of claim 1, further comprising a second pocket, the second pocket being accessible on a surface of the headband.

5. The eyeglasses and headband combination apparatus of claim 1, further comprising an area defined on a surface of the headband for indicia to be disposed thereon.

6. An eyeglasses and headgear combination apparatus comprising:

a headgear an annular shape and being configured and dimensioned to be worn on the head of a user, wherein the headgear includes a circumferential pocket spanning the forehead area, the pocket being defined between a first wall and a second wall, the pocket having a circumferential opening defined between a first wall edge and a second wall edge, wherein the second wall edge further includes a first engagement member, the first engagement member comprising a first gutter wall protruding radially inward over a portion of the circumferential opening and a second gutter wall protruding axially in the direction of the pocket;

eyeglasses within the circumferential pocket and engageable with the headband, the eyeglasses including an upper peripheral edge, the upper peripheral edge including a second engagement member, the second engagement member including a first lip wall protruding radially outward and a second lip wall protruding axial in the direction of the circumferential opening; and wherein the first engagement member and the second engagement member are positioned and dimensioned to cooperate with one another, whereby axial movement of the eyeglasses from the circumferential pocket in a first direction forms a non-permanent engagement of the first engagement member and the second engagement member to restrict further axial movement of the eyeglasses in the first direction, and axial movement of the eyeglasses in a second direction disengages the non-permanent engagement of the first engagement member and the second engagement member.

7. The eyeglasses and headgear combination apparatus of claim 6, wherein the first direction and the second direction are opposite one another.

8. The eyeglasses and headgear combination apparatus of claim 6, wherein a distal edge of second lip wall contacts the first gutter wall responsive to the non-permanent engagement of the first engagement member and the second engagement member.

9. The eyeglasses and headgear combination apparatus of claim 6, wherein a distal edge of second gutter wall contacts the first lip wall responsive to the non-permanent engagement of the first engagement member and the second engagement member.

10. The eyeglasses and headgear combination apparatus of claim 6, wherein the second gutter wall contacts the second lip wall responsive to the non-permanent engagement of the first engagement member and the second engagement member.

11. The eyeglasses and headgear combination apparatus of claim 7, wherein the headgear has a first width and a second width, the first width being in a portion of the headgear with the pocket, wherein the first width is greater than the second width.

12. The eyeglasses and headgear combination apparatus of claim 7, wherein the headgear comprises a headband.

13. The eyeglasses and headgear combination apparatus of claim 12, wherein the headband is annular.

14. The eyeglasses and headgear combination apparatus of claim 13, wherein the headband has a first width and a second width, the first width being in a portion of the headgear with the pocket, wherein the first width is greater than the second width.

15. The eyeglasses and headband combination of claim 7 wherein the headband is constructed of a material having a property of being water absorbent.

16. The eyeglasses and headband combination of claim 7 wherein the headband is constructed of a material having a property of being elastic.

17. The eyeglasses and headband combination of claim 7 wherein the sunglasses further comprise a polarized lens.

18. The eyeglasses and headband combination of claim 7, wherein the eyeglasses are further configured to facilitate use of an interchangeable lens.

* * * * *